(12) United States Patent
Jacob et al.

(10) Patent No.: US 10,108,733 B2
(45) Date of Patent: Oct. 23, 2018

(54) METHODS AND SYSTEMS FOR PROVIDING CUSTOMIZED WEB PAGES TO USERS OF A WEBSITE

(71) Applicant: salesforce.com, inc., San Francisco, CA (US)

(72) Inventors: Anil Jacob, Fremont, CA (US); Amol Hardikar, Greenbrae, CA (US); Archana Sethuraman, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 112 days.

(21) Appl. No.: 15/165,079

(22) Filed: May 26, 2016

(65) Prior Publication Data
US 2017/0344568 A1    Nov. 30, 2017

(51) Int. Cl.
G06F 3/00      (2006.01)
G06F 17/30     (2006.01)
G06F 17/22     (2006.01)
G06F 17/24     (2006.01)

(52) U.S. Cl.
CPC ...... *G06F 17/3089* (2013.01); *G06F 17/2205* (2013.01); *G06F 17/2247* (2013.01); *G06F 17/245* (2013.01)

(58) Field of Classification Search
CPC ............... G06F 17/2205; G06F 17/235; G06F 17/2247; G06F 17/2288; G06F 17/30876; G06F 17/3089; G06F 17/245
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

*Primary Examiner* — Kyle R Stork
(74) *Attorney, Agent, or Firm* — Lorenz & Kopf, LLP

(57) ABSTRACT

Computer implemented methods and systems are provided for providing customized web pages that are customized for each user. A database can store first entries each being configured to store user information for each user, and second entries each being configured to store an identifier and customized content for each user (or alternatively a way to retrieve such customized content). A tree-like data structure is stored in cache and includes nodes that each store an identifier that refers to one of the second entries. After log in, the server system retrieves user information associated with the particular user and uses it to retrieve a particular identifier stored by a particular node. Using a corresponding one of the second entries that includes the particular identifier, particular customized content for the particular user can be retrieved and sent to a user system where it is used to display a particular customized web page for that particular user.

20 Claims, 9 Drawing Sheets

(56) References Cited

U.S. PATENT DOCUMENTS

| | | | |
|---|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,201,977 B2 * | 12/2015 | Lukes ............ G06F 17/3089 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0182756 A1 * | 8/2005 | Eppley ............ G06F 17/30961 |
| 2006/0021019 A1 | 1/2006 | Hinton et al. |
| 2007/0088741 A1 * | 4/2007 | Brooks ............ G06F 8/68 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 * | 9/2013 | Cinarkaya ............ H04L 67/02 726/27 |
| 2016/0247188 A1 * | 8/2016 | Zhou ............ G06F 17/30867 |

* cited by examiner

300 ⤳

User table of tenant database

| ID | Username | Detail 1 | Detail 2 | | Detail N |
|---|---|---|---|---|---|
| a10s01001001 | User 1 | ... | ... | ... | |
| a11Y01001001 | User 2 | .... | ... | ... | |
| ....... | | ........... | ........... | ........... | |

Content table of tenant database

| ID | Content |
|---|---|
| a10s01001001 | BLOB |
| a11Y01001001 | Link |
| ....... | .............. |

User table of tenant database 500

| | 502 | 504 | 506 | 508 | 509 |
|---|---|---|---|---|---|
| | ID | Username | Country | Business type | Business sub type |
| | a10s01001001 | jdoe@southwestelectricals.com | USA | Electrician | Electrical household |
| | a10s01001034 | janesmith@southwestelectricals.com | JPN | Electrician | |
| | a10s01004x34 | apatterson@southwestelectricals.com | CHI | Construction | |

FIG. 5A

Content table of tenant database 536

| ID | Color (optional) | Layout... | Content_value |
|---|---|---|---|
| 0012 | Blue | Grid | BLOB |
| 00211 | Red | Column | BLOB |

FIG. 5C

User table of tenant database 600

| ID | Username | School district | School type | Grade |
|---|---|---|---|---|
| a10s01001456 | tom@alphaschool.com | School district 1 | Primary school | Grade 1 |
| a10s01003545 | tina@alphaschool.com | School district 1 | Primary school | Grade 2 |
| a10s0103546 | jill@exampleschool.com | School district 3 | Pre-k | |

FIG. 6A

Content table of tenant database ~636

| Database ID | Color (optional) | Layout... | Content_value |
|---|---|---|---|
| 000610 | Purple | Grid | BLOB |
| 000620 | Green | Column | BLOB |

METHODS AND SYSTEMS FOR PROVIDING CUSTOMIZED WEB PAGES TO USERS OF A WEBSITE

TECHNICAL FIELD

Embodiments of the subject matter described herein relate generally to computer implemented methods and systems for providing web pages to users of a website, and, more particularly, to computer implemented methods and systems for providing customized web pages to users of a website.

BACKGROUND

Conventionally, after a designer created a website the designer could then manually modify the website to customize it for different users. This approach was found to be tedious and time-consuming.

More recently, technologies have been developed that allow for customized content to be retrieved and automatically sent to each user to display a customized web page when the user visits a particular page. This gives each user a customized experience when they view a certain page.

Conventional approaches suffer from a number of drawbacks including that they are difficult to implement, inflexible, inefficient and consume large amounts of storage space. The conventional approaches can also lead to difficulty in supporting future growth as the number of criteria used to differentiate between users increases. In addition, the conventional approaches suffer from poor performance since retrieval can be inefficient in terms of complexity required to search for and retrieve customized content. Moreover, the conventional approaches can also be difficult to maintain due to the large number of customizations needed for the different users that access a website. In addition, the conventional approaches can be difficult to maintain as it is not easy to make changes to the underlying database, which might be required due to business changes.

As such, there is a need for improved techniques and technologies for delivering customizing web pages to each user so that they are automatically targeted for each user based on their characteristics and/or preferences.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

FIG. 3 is a portion of a user information store in accordance with one exemplary implementation of an embodiment.

FIG. 4 is a portion of a content store in accordance with one exemplary implementation of an embodiment.

FIG. 5A is a portion of a user information store in accordance with one exemplary implementation of an embodiment.

FIG. 5C is a portion of a content store in accordance with one exemplary implementation of an embodiment.

FIG. 6A is a portion of a user information store in accordance with one exemplary implementation of an embodiment.

DETAILED DESCRIPTION

Computer implemented methods and systems are provided for providing customized web pages that are customized for each user. For instance, in one embodiment, the methods and systems can allow entities such as businesses, companies, school systems, etc. to provide customized web content to their users that is customized based on their regional and business preferences. A database can store a plurality of first entries each being configured to store user information for each user, and a plurality of second entries each being configured to store an identifier and customized content for each user (or alternatively a way to retrieve such customized content). A tree-like data structure is stored in cache and includes nodes that each store an identifier that refers to one of the second entries. After log in, the server system retrieves user information associated with a particular user and uses it to retrieve a particular identifier stored by a particular node. Using a corresponding one of the second entries that includes the particular identifier, particular customized content for the particular user can be retrieved and sent to a user system where it is used to display a particular customized web page that is customized for that particular user.

Figure 1:
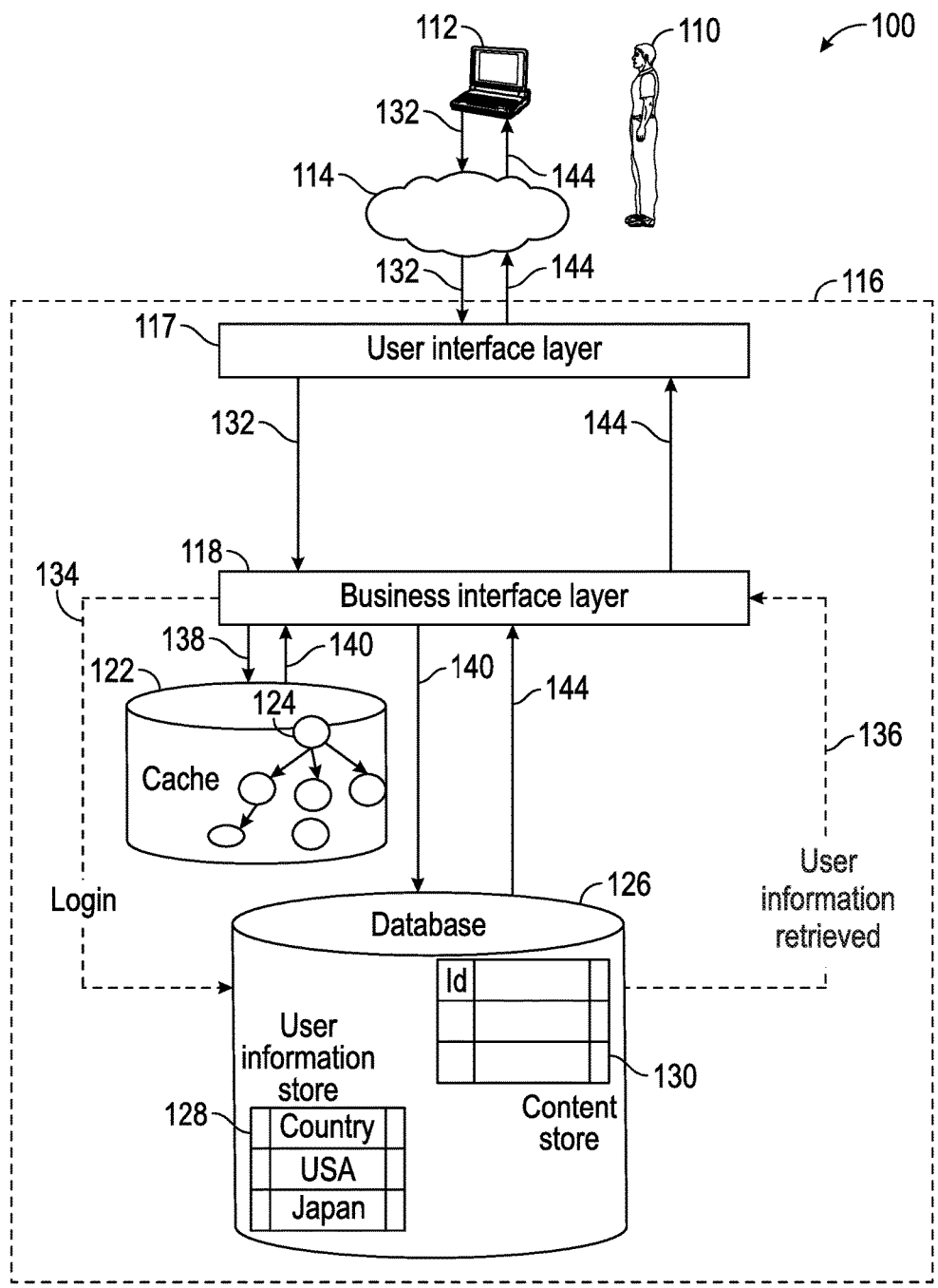
FIG. 1 illustrates a block diagram of a system in which the disclosed embodiments may be implemented.

FIG. 1 illustrates a block diagram of a system 100 in which the disclosed embodiments may be implemented in accordance with the disclosed embodiments. The system 100 includes a user system 112 that is communicatively coupled to a server system 116 via a network 114. The server system 116 can provide web pages to users of a website. In this embodiment, the user system 112 is operated by a particular user 110 who is attempting to access a web page served by the server system 116 although it should be appreciated that this is a simplified representation and that many different user systems and users would access the server system 116 in a practical implementation.

In accordance with the disclosed embodiments, each web page is customized for a given user meaning that the server system 116 provides a customized web page to each user that includes content that is customized for that user. The server system 116 can vary depending on the implementation. For example, in one implementation, the server system 116 can be implemented via a web server, whereas in another implementation, the server system 116 can be a cloud-based server system that will be described in greater detail below.

In this embodiment, the server system 116 includes a user interface layer 117, a logic layer 118 (also referred to herein as a business logic layer, which in one implementation can be a tenant management process layer), a cache 122, and a database 126, which in one implementation can be a tenant database. The server system 116 may optionally include other elements, modules, components or layers that are not illustrated for sake of simplicity.

The database 126 can store multiple tables or objects. In accordance with the disclosed embodiments, two examples of tables or objects that can be stored in the database 126 include a user information store 128 and a content store 130 both of which can be implemented as either tables of objects depending on the implementation. In one implementation, the database can be a tenant database that stores data for multiple tenants, and the logic layer can be referred to as a tenant management process layer.

The user information store 128 includes a number of entries that are each used to store user information for a particular user, such as user 110. As used herein, the term "entries" can refer, for example, to rows in a table or records in an object. To distinguish entries in the user information store 128 from entries in the content store 130, the entries in the user information store 128 will be referred to here as "first" entries, whereas the entries stored in the content store 130 will be referred to as "second" entries, which will be explained below.

In one embodiment, the user information store 128 is a user table, and each first entry in the user table comprises a row that stores an identifier and user information for a user. The identifier is a set of characters that uniquely identifies one of the rows in the user information table. Each row can include a number of properties fields that each store a detail about that particular user or a property associated with that particular user. The user table organizes the information about each user into rows and columns. The user information that is stored in the user information store 128 can be any type of information associated with a particular user including information that provides details about and/or that is associated with the user. For example, the user information for the particular user comprises one or more details that are associated with that particular user, where each of the details has a name. As will be described below, these details are of importance in determining what type of content (e.g., customized content) should be provided to that user when that user requests a web page from the server system 116.

FIG. 3 is a portion of a user information store 128 in accordance with one exemplary implementation of an embodiment. In this particular non-limiting example, the identifiers can be stored in a column 310, and the user information that is stored includes the username in column 320, a first user detail in column 330, a second user detail in column 340, and an nth user detail in column 350. Each single piece of data is a field in the table. A column consists of all the entries in a single field. Fields, in turn, are organized as rows, which are complete sets of information (such as the set of information about a particular user), each of which comprises one row.

In another embodiment (not illustrated), the user information store 128 is a user object, and each first entry of the user object comprises a record that stores user information for a user, wherein each record comprises an identifier and properties fields that each store a detail about that user. A record is analogous to a row in a database table. The identifier is a set of characters that uniquely identifies one of the records in the user object. In the context of Salesforce platform, the user object is a type of standard object that custom fields can be added to in order to store any additional attributes or information that are desired.

The content store 130 includes a number of second entries, each of which can be, for example, a row in a table or a record in an object depending on the implementation of the server system 116. Each second entry can store at least an identifier and either customized content for a user that is used to render a customized web page customized for that user, or alternatively an attached file that comprises the customized content for a user that is used to render a customized web page customized for that user, or alternatively a link to access the customized content for a user that is used to render a customized web page customized for that user. In one embodiment, the content store 130 is content table that content data that is referred to by a unique identifier. Each second entry in the content table is a row that stores (at least) an identifier and a collection of data, such as a binary large object (BLOB). The identifier is a set of characters that uniquely identifies one of the rows in the content table, and the "collection of data" comprises customized content that is used to generate a customized web page.

FIG. 4 is a portion of a content store in accordance with one exemplary implementation of an embodiment. In this particular example, the content store 130 is implemented as a table 400. In this particular non-limiting example, the identifiers can be stored in a column 410, and the customized content is stored in column 420. Each row can also include many additional fields in additional columns to store additional customization information or customized content.

In another embodiment (not illustrated), the content store 130 can be implemented as a content custom object, in which each second entry comprises a record that stores at least an identifier and an attached file that comprises customized content that is used to generate a customized web page. The identifier is a set of characters that uniquely identifies one of the records in the content custom object. The customized content can be anything that is displayed via a web page. Examples can include, but are not limited to, of images, documents, html pages, news items, graphics, video, new articles, or any other information that is rendered on the web site.

Each customized web page can include an information set that contains numerous types of information, which is able to be seen, heard or interacted with by a particular user and is customized for that particular user. A web page can include perceived (or rendered) information including but not limited to: textual information, non-textual information, static images (e.g., raster graphics, typically GIF, JPEG or PNG; or vector formats such as SVG or Flash), animated images (e.g., Animated GIF and SVG, Flash, Shockwave, or Java applet), audio, (e.g., MP3, Ogg or various proprietary formats), video (e.g., WMV (Windows), RM (RealMedia), FLV (Flash Video), MPG, MOV (QuickTime)), interactive information including text, illustrations (e.g., DHTML, "click to play" images to games, typically using script orchestration, Flash, Java applets, SVG, or Shockwave, buttons, forms providing an alternative interface for use with script orchestration and DHTML, hyperlinks, forms, etc.) A web page can include internal (or hidden) information including but not limited to: comments, linked files (e.g., through Hyperlink (like DOC, XLS, PDF, etc.), metadata with semantic meta-information (e.g., charset information, Document Type Definition (DTD), etc.), diagrammatic and style information: information about rendered items (like image size attributes) and visual specifications, as Cascading Style Sheets (CSS), scripts (e.g., JavaScript, complement interactivity, and functionality). A web page can also contain dynamically adapted information elements, dependent upon the rendering browser or end-user location (through the use of IP address tracking and/or "cookie" information).

In accordance with the disclosed embodiments, the cache 122 can store a tree-like data structure 124. The tree-like data structure 124 includes a plurality of nodes that can be arranged into a plurality of n different levels, where n is an integer greater than or equal to 2. Each node can store a name, and a value that is associated with that node. Each value serves as a corresponding identifier that refers to one of the second entries in the content store 130. Each detail of the user information corresponds to one of the nodes of the tree-like data structure 124.

For example, in a tree-like data structure 124 in which the nodes are arranged into a three different levels (i.e., where n=3), the nodes of the tree-like data structure 124 can include a root level node can store a default identifier, one or more first level nodes, one or more second level nodes, and one or more third level nodes. In many implementations, there would be a plurality of first level nodes, a plurality of second level nodes, a plurality of third level nodes, etc. Each of the first level nodes can store a first level name and a first level identifier that corresponds to an identifier in the content store 130 that is associated with customized content in the content store 130. Likewise, each of the second level nodes can store a second level name and a second level identifier that corresponds to an identifier in the content store 130 that is associated with customized content in the content store 130. Similarly, each of the lowest level nodes can store a third level name and a third level identifier that corresponds to an identifier in the content store 130 that is associated with customized content in the content store 130. Each level node is related to the previous level node via parent-child relationship. For example, a particular third level node will be a child node of a particular second level node that is the parent node of that particular third level node, a particular second level node will be a child node of a particular first level node that is the parent node of that particular second level node, and each first level node will be a child node of a root level node that is the parent node of that first level node.

The tree-like data structure 124 can store identifiers in memory (cache) in a segmented way to provide customized content to users in a flexible and scalable way. The tree-like data structure 124 can be created programmatically making it relatively easy to create. The tree-like data structure 124 is flexible and easily scalable. The tree-like data structure 124 can be easily modified and maintained (e.g., using any segmentation criteria). The tree-like data structure 124 can grow easily as additional branches can be added (e.g., either to an existing branch or as a new branch). In addition, by simply changing the identifier that is used in any particular node, new content can be added or updated. Thus, when a change is desired, an administrator can simply update the values of identifiers in one or more of the nodes of the tree-like data structure 124 to change customized content shown to the end user. The tree-like data structure 124 can reduce the amount of storage space needed since each identifier is stored only once. The tree-like data structure 124 can reduce the complexity required to search for and retrieve customized content. Data retrieval is very efficient because execution time will be on the order of O(log N), where N is the number of items on which execution takes place. O(log N) has faster execution time compared to O(N) because Log N is a smaller subset of N there by reducing the number of executions. The traversal is easy since simple calls can be made to cache (e.g., a single cache get command) to retrieve the relevant identifier. Since the tree-like data structure 124 is in memory (rather than on disk) access is very fast in that there is no I/O time, which allows a user to access a customized page very quickly.

Figure 2:
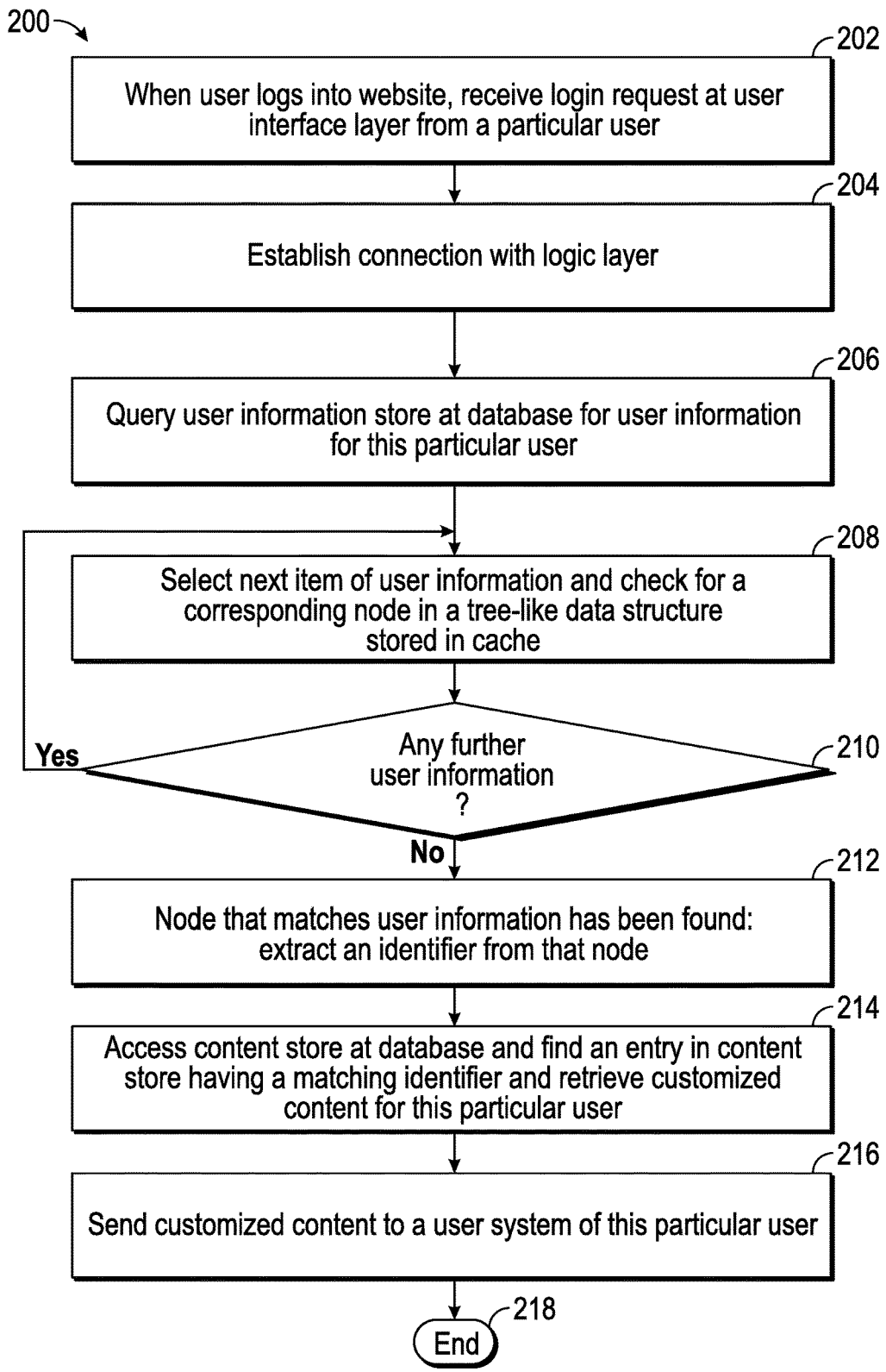
FIG. 2 is a flowchart that illustrates an exemplary method for providing a customized web page to a user that includes content that is customized for that user in accordance with an embodiment.

To explain the how this tree-like data structure 124 is used, the interaction of the logic layer 118 and the user interface layer 117 with the cache 122, and the user information store 128 and the content store 130 of the database 126 will now be described with reference to FIG. 2. Tasks performed by the various elements in FIG. 1 will be described in greater detail below with reference to FIG. 2, which is a flowchart that illustrates an exemplary method 200 for providing a customized web page to a user that includes content that is customized for that user in accordance with an embodiment. FIG. 2 will be described with reference to FIG. 1. As a preliminary matter, it should be understood that steps of the method 200 are not necessarily limiting, and that steps can be added, omitted, and/or performed simultaneously without departing from the scope of the appended claims. It should also be understood that the illustrated method 200 can be stopped at any time. In certain embodiments, some or all steps of this process, and/or substantially equivalent steps, are performed by execution of processor-readable instructions stored or included on a processor-readable medium, for example. For instance, in the description of FIG. 2 that follows, the user system 112 and the server system 116 will be described as performing various acts, tasks or steps, but it should be appreciated that this refers to processing system(s) of the user system 112 and processor systems of the server system 116 executing instructions to perform those various acts, tasks or steps. Depending on the implementation, the processor systems of the server system 116 can be centrally located, or distributed among a number of server systems that work together. Furthermore, in the description of FIG. 2, it will be understood that any actions described as being performed by the user are performed by the user interacting with the user system 112.

As shown in FIG. 2, method 200 begins at 202, when the user interface layer 117 can receive the login request 132 from the particular user system 112 for a web page of the website. The login request comprises credentials for the particular user 110, such as a username and password, in one particular implementation. The user interface layer 117 can determine whether the login request is granted or denied, and when the login request is granted, and upon accepting the login request 132, at 204, the user interface layer 117 can establish a connection 132 to the logic layer 118.

At 206, the logic layer 118 can process the login request 132 from the user interface layer 117 to generate the query 134 to retrieve user information 136 for that particular user. To explain further, in response to the login request 132 from the particular user 110, the logic layer 118 is can retrieve user information 136 associated with a particular user 110 from the user information store 128. After the user information 136 associated with that particular user 110 has been retrieved, the logic layer 118 can then use the user information 136 to retrieve a particular identifier 140 (having a particular value) that is stored by a particular node in the tree-like data structure 124.

In one embodiment, for each detail of the user information that is associated with the particular user (and that was retrieved by the logic layer 118), the logic layer 118 can issue a call to the cache 122 to determine whether there is a corresponding node in the tree-like data structure 124 that has a name that matches that detail of the user information 136. The logic layer 118 can issue one or more calls to the cache 122 (e.g., one call for each detail), starting with a first call for a first detail specified in the user information that is associated with a first level, and ending with a last call for a last detail specified in the user information.

Thus, during the first iteration of 208, the logic layer 118 selects the first detail specified in the user information that is associated with a first level, and issues a first call corresponding to the first detail specified in the user information that is associated with a first level node in the tree-like data structure 124. The logic layer 118 can then retrieve an identifier from that first level node (that is determined to have a name that matches that first detail specified by the user information 136), and the method proceeds to 210. At 210, the logic layer 118 determines whether any further details are specified in the user information, and if so, the method 200 loops back to 208, where the logic layer 118 can issue another call to the cache 122 to determine whether there is a corresponding second level node in the tree-like data structure 124 that has a name that matches that second detail of the user information 136, and if so, the logic layer 118 can then retrieve an identifier from that second level node (that is determined to have a name that matches that second detail specified by the user information 136), and the method proceeds to 210. The loop at 208, 210 repeats until the logic layer 118 determines (at 210) that no further details are specified in the user information 136.

When the logic layer 118 determines (at 210) that no further details are specified in the user information, the method 200 proceeds to 212. At 212, the logic layer 118 has retrieved the particular identifier 140 from a lowest-level node in the tree-like data structure 124 that is determined to have a name that matches one of the details specified by the user information 136. The particular identifier 140 that is retrieved by the logic layer 118 serves as a primary key that the logic layer 118 can use to access a corresponding one of the second entries in the content store 130 that also includes the particular identifier 140 having the particular value. At 214, the logic layer 118 can use the particular identifier 140 to find a particular second entry in the content store 130 that has a matching identifier, and then retrieve particular customized content 144 for this particular user 110 from that particular second entry in the content store 130.

At 216, the user interface layer 117 can then communicate the particular customized content 144 to the particular user system 112 associated with the particular user 110 so that the particular user system 112 can display a particular customized web page of the website that includes the particular customized content 144 for that particular user 110. For example, in one embodiment, the user interface layer 117 sends a file that includes all of the customized content 144 to a browser application executing at the user system 112, which then displays a customized web page that includes the customized content.

Implementation Example: Business Customer User

To illustrate one exemplary, non-limiting implementation, an example will now be described in which a user, John Doe, who is a US industrial electrician, visits a business website. This implementation will be described with reference to FIGS. 5A through 5C.

FIG. 5A is a portion of a user information store 128 in accordance with one exemplary implementation of an embodiment. In this particular example, the user information store is part of a database for a business and is implemented as a user information table 500 that stores customer information. In this particular non-limiting example, the identifiers can be stored in a column 502, and the details or customer information that are stored include the username in column 504 (e.g., an e-mail address of the user), the customer's country in column 506, the customer's business type in column 508, and the customer's business specialization or specialty within that business type in column 509. The table 500 could also include additional details of customer information, for example, address information (e.g., city, street, zip code), occupation, account numbers, phone numbers, and so on as a series of other columns that are not shown for sake of simplicity. Each single piece of data (such as the country) is a field in the table. A column consists of all the entries in a single field, such as the countries of all the customers. Fields, in turn, are organized as rows, which are complete sets of information (such as the set of information about a particular customer), each of which comprises one row.

Figure 5B:
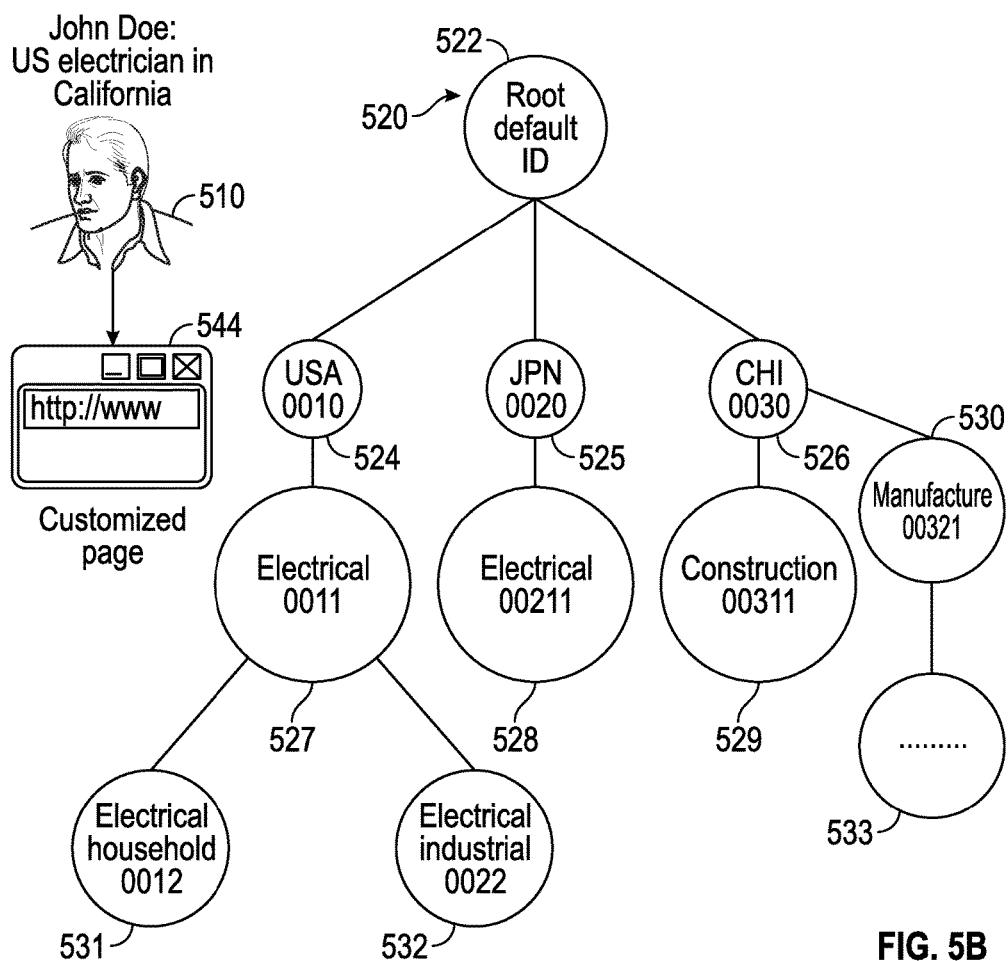
FIG. 5B illustrates a diagram of a tree-like data structure that can be stored in cache and used to generate a customized web page for a particular user in accordance with one exemplary implementation.

FIG. 5B illustrates a diagram of a tree-like data structure 520 that can be stored in cache 122 and used to generate a customized web page 544 for a particular user 510 in accordance with one exemplary implementation. In this particular example, the tree-like data structure 520 includes nodes that are arranged into three different levels (i.e., where n is 3). It will be appreciated that this example is simplified and non-limiting, and that in other implementations, a tree-like data structure can include many more levels and many more nodes. The tree-like data structure 520 can include a root level node 522 that stores a default identifier, first level nodes 524, 525, 526 each of which can store a first level name that corresponds to a particular country and a first level identifier that corresponds to an identifier in the content store 130 that is associated with customized content in the content store 130, second level nodes 527, 528, 529, 530 each of which can store a second level name that corresponds to a particular business type and a second level identifier that corresponds to an identifier in the content store 130 that is associated with customized content in the content store 130, and third level nodes 531, 532, 533 each of which can store a third level name that corresponds to a particular channel of the particular business type and a third level identifier that corresponds to an identifier in the content store 130 that is associated with customized content in the content store 130.

As such, when a user John Doe 510 logs in, the logic layer reads and retrieves user information for John Doe 510 from a first row of the user information store of FIG. 5A. After retrieving the user information, the logic layer uses the user information to retrieve an identifier from the tree-like data structure 520 that is stored in cache 122. To do so, the logic layer first makes a call to the cache (e.g., Cache.Org.get (Usercountry)), and the country USA gets returned from the first level node 524 with an identifier 0010. The logic layer then makes another call to the cache (e.g., Cache.Org.get (BusinessType)), and the business type Electrical gets returned from the second level node 527 with an identifier 0011. The logic layer then makes a final call to the cache (e.g., Cache.Org.get(BusinessSpecialization)), and the business specialization Electrical household gets returned from the third level node 531 with an identifier 0012.

FIG. 5C is a portion of a content store in accordance with one exemplary implementation of an embodiment. In this particular example, the content store 130 is implemented as a content table 536. In this particular non-limiting example, the identifiers can be stored in a column 537, and the customized content is stored in column 540 as a BLOB, which is one example of a collection of binary data stored that can be stored as a single entity in the content table 536. Blobs can include images, audio or other multimedia objects, binary executable code, etc. Each row can also include many additional fields to store additional customization information or customized content. In the particular example illustrated in FIG. 5C, the additional fields include color in column 538, and layout in column 539.

The identifier (0012) that was retrieved from the tree-like data structure 520 serves as a primary key that refers to a particular (single) row in the content table 536 of FIG. 5C. The relevant, customized content is identified within the content table 536 by the identifier that is unique to a particular row of the content table 536. The logic layer uses the value (0012) of the identifier to make a query to access the row of the content table 536 that has the matching identifier, and retrieves corresponding content that is stored in the Content_Value column 540 of the content table 536 as a BLOB (in this particular non-limiting implementation). This BLOB includes content that is customized for a US household electrician located in the United States. As a result, when the customized content (from the BLOB) is displayed at the user system of John Doe 510, John Doe 510 will see a customized page 544 that is customized for him based on his user information.

Implementation Example: Student User

To illustrate another exemplary, non-limiting implementation, an example will now be described in which a user, Tom, who is a Grade 1 student at a primary school in school district 1, visits a student information website. This implementation will be described with reference to FIGS. 6A through 6C.

FIG. 6A is a portion of a user information store 128 in accordance with one exemplary implementation of an embodiment. In this particular example, the user information store is part of a database for a school system and is implemented as a table 600 that stores user information for different students. In this particular non-limiting example, the identifiers can be stored in a column 602, and the user information that is stored includes the username in column 604 (e.g., an e-mail address of the student), the user's school district in column 606, the user's school type in column 608, and the user's grade in column 609. The table 600 could also include, for example, additional columns not shown that store additional details for each student. Each single piece of data (such as the grade) is a field in the table. A column consists of all the entries in a single field, such as the school type of all the students. Fields, in turn, are organized as rows, which are complete sets of information (such as the set of information about a particular student), each of which comprises one row.

Figures 6B, 6C:
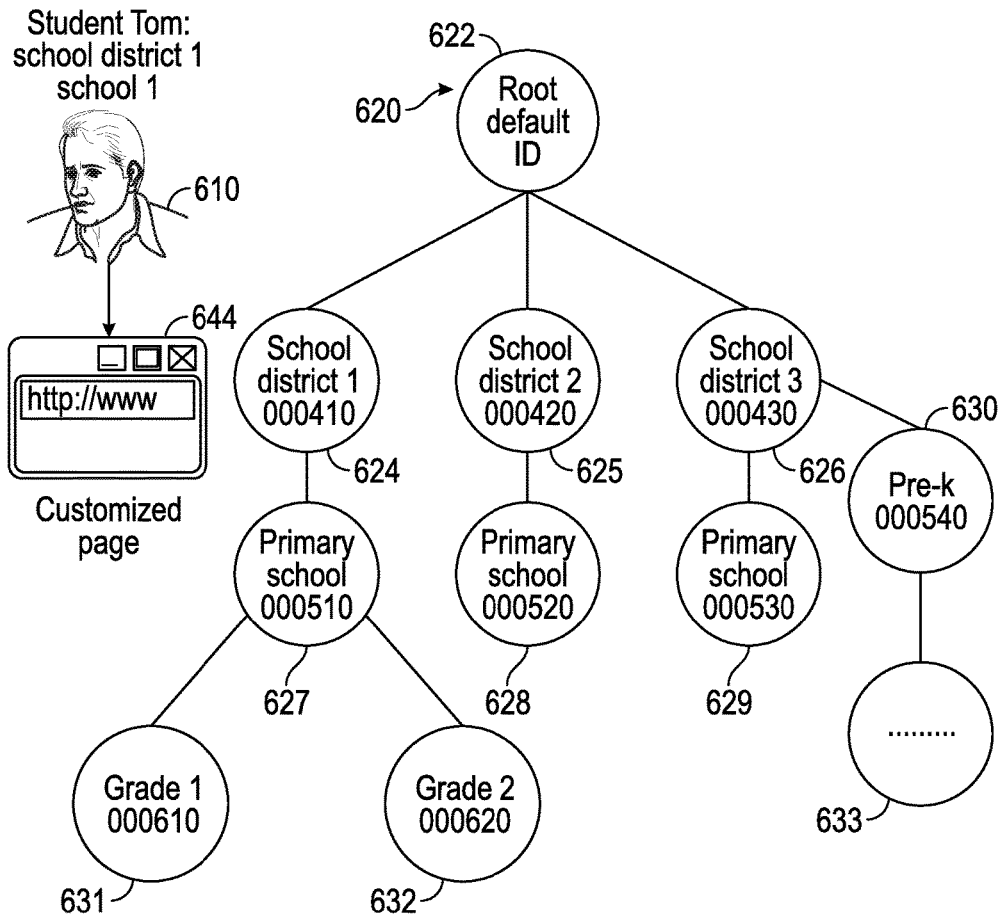
FIG. 6B illustrates a diagram of a tree-like data structure that can be stored in cache and used to generate a customized web page for a particular user in accordance with one exemplary implementation.
FIG. 6C is a portion of a content store in accordance with another exemplary implementation of an embodiment.

FIG. 6B illustrates a diagram of a tree-like data structure 620 that can be stored in cache 122 and used to generate a customized web page 644 for a particular user 610 in accordance with one exemplary implementation. In this particular example, the tree-like data structure 620 includes nodes that are arranged into three different levels (i.e., where n is 3). As in FIG. 5B, it will be appreciated that this example is simplified and non-limiting, and that in other implementations, a tree-like data structure can include many more levels and many more nodes. The tree-like data structure 620 can include a root level node 622 that corresponds to a particular state and that can store a default identifier; first level nodes 624, 625, 626 each of which can store a first level name that corresponds to a particular school district within the particular state, and a first level identifier that corresponds to an identifier in the content store 130 that is associated with customized content in the content store 130; second level nodes 627, 628, 629, 630 each of which can store a second level name that corresponds to a particular school within the particular school district, and a second level identifier that corresponds to an identifier in the content store 130 that is associated with customized content in the content store 130; and third level nodes 631, 632, 633 each of which can store a third level name that corresponds to a particular grade within a particular school, and a third level identifier that corresponds to an identifier in the content store 130 that is associated with customized content in the content store 130. Using this tree-like data structure 620, students can visit the same website and get access to customized web pages based on their school and grade. The content can be changed dynamically by changing the identifiers at each node that point to the location of the actual content used to generate the customized web pages.

For example, when a user, Tom 610, who is a student from School District 1, logs in, the logic layer reads and retrieves user information for Tom 610 from a user information store that is shown in FIG. 6A. After retrieving the user information, the logic layer uses the user information to retrieve an identifier from the tree-like data structure 620 that is stored in cache 122. To do so, the logic layer first makes a call to the cache (e.g., Cache.Org.get(Schooldistrict)), and the School district 1 gets returned from the first level node 624 with an identifier 000410. The logic layer then makes another call to the cache (e.g., Cache.Org.get(SchoolType)), and the primary school gets returned from the second level node 627 with an identifier 000510. In the final call, the logic layer then makes another call to the cache (e.g., Cache.Org.get(Grade)), and the Grade 1 gets returned from the third level node 534 with an identifier 000610.

FIG. 6C is a portion of a content store in accordance with another exemplary implementation of an embodiment. In this particular example, the content store is implemented as a content table 636 that stores student information. In this particular non-limiting example, the identifiers can be stored in a column 637, and the customized content is stored in column 640 as a BLOB, which is one example of a collection of binary data stored that can be stored as a single entity in the content table 636. Each row can also include many additional fields to store additional customization information or customized content. In the particular example illustrated in FIG. 6C, the additional fields include color in column 638, and layout in column 639.

The identifier (000610) that was retrieved from the tree-like data structure 620 serves as a primary key that refers to a particular (single) row in the content table 636 that is illustrated in FIG. 6C. The relevant content is identified within the content table 636 by this identifier that is unique to a particular row of the content table 636. The logic layer uses the value of the identifier to make a query to access a row of the content table 636 that has the matching identifier, and retrieves corresponding content that is stored in a Content_Value column 640 of the content table 636. This content is customized for a student in in Grade 1 of a primary school in school district 1. As a result, when the customized content is displayed at the user system of Tom 610, Tom 610 will see a customized page 644 of a student information website that is customized for him based on his user information, and can allow Tom 610 to view customized content for his particular school district, school, grade, such as syllabus, events, supplies, etc.

Figure 7:
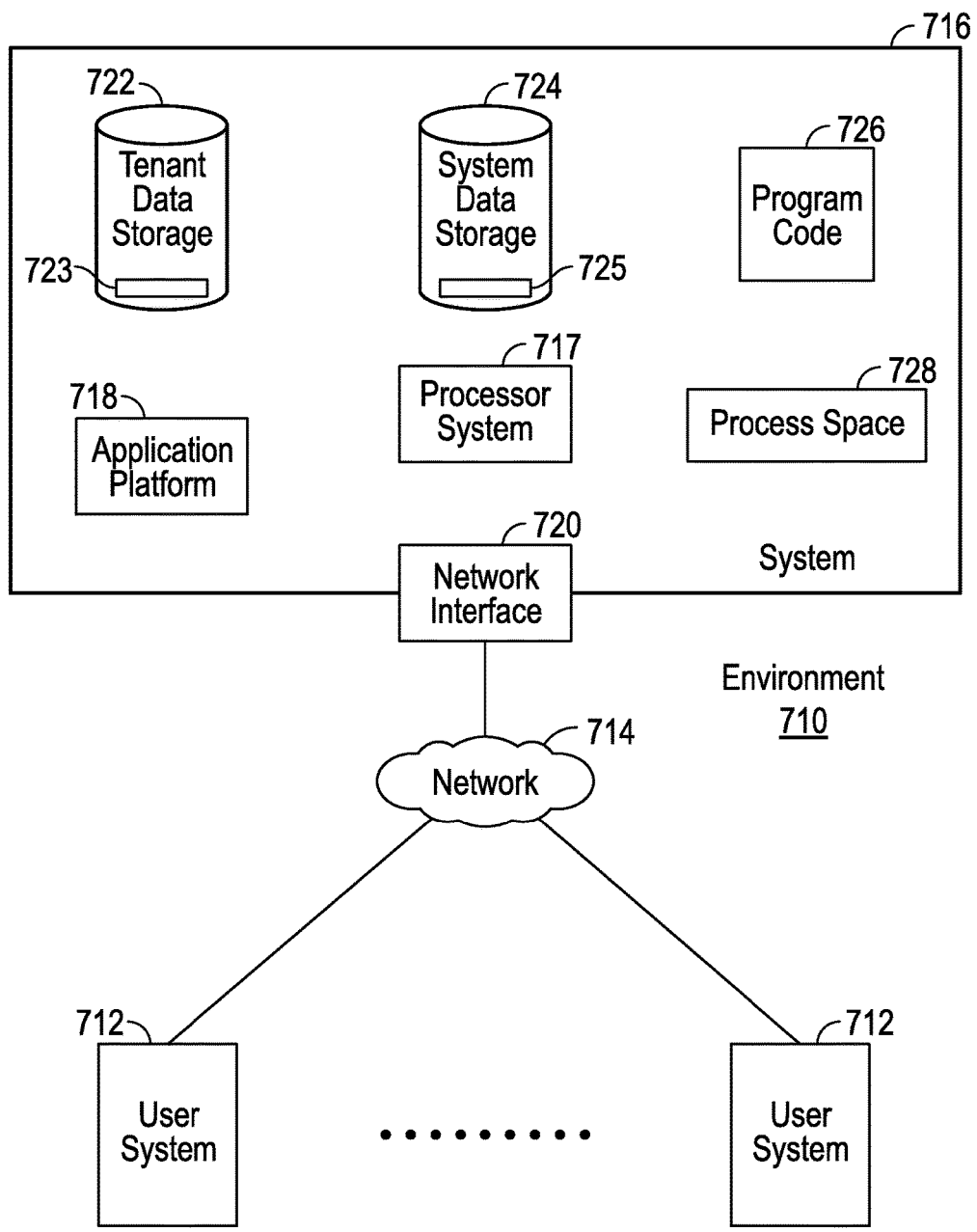
FIG. 7 illustrates a block diagram of an example environment in which the embodiments described herein may be implemented.

FIG. 7 illustrates a block diagram of an example environment 710 in which the embodiments described herein may be implemented. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716. System 716 may also be referred to as a cloud service provider. System 716 provides its resources to customers (e.g., end users) as a service.

An on-demand database service, such as system 716, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, system 716 may include an application platform 718 that enables creating, managing, and executing one or more applications developed for an on-demand database service, for users accessing the on-demand database service via user systems 712, or for third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User systems 712 might communicate with system 716 using TCP/IP and, at a higher network level, use other common Internet protocols to communicate, such as hyper-text transfer protocol (HTTP), file transfer protocol (FTP), Andrew file system (AFS), wireless application protocol (WAP), etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as to provide related data, code, forms, webpages and other information to and from user systems 712. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party application developer) software applications, which may or may not include CRM, may be supported by the application platform 718, which manages the creation and storage of the applications into one or more database objects, and executing of the applications in a virtual machine in the process space 728 of the system 716. The terms "application," "software application," "software package," "software code," and "program code" are used interchangeably.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Google's Chrome browser, Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
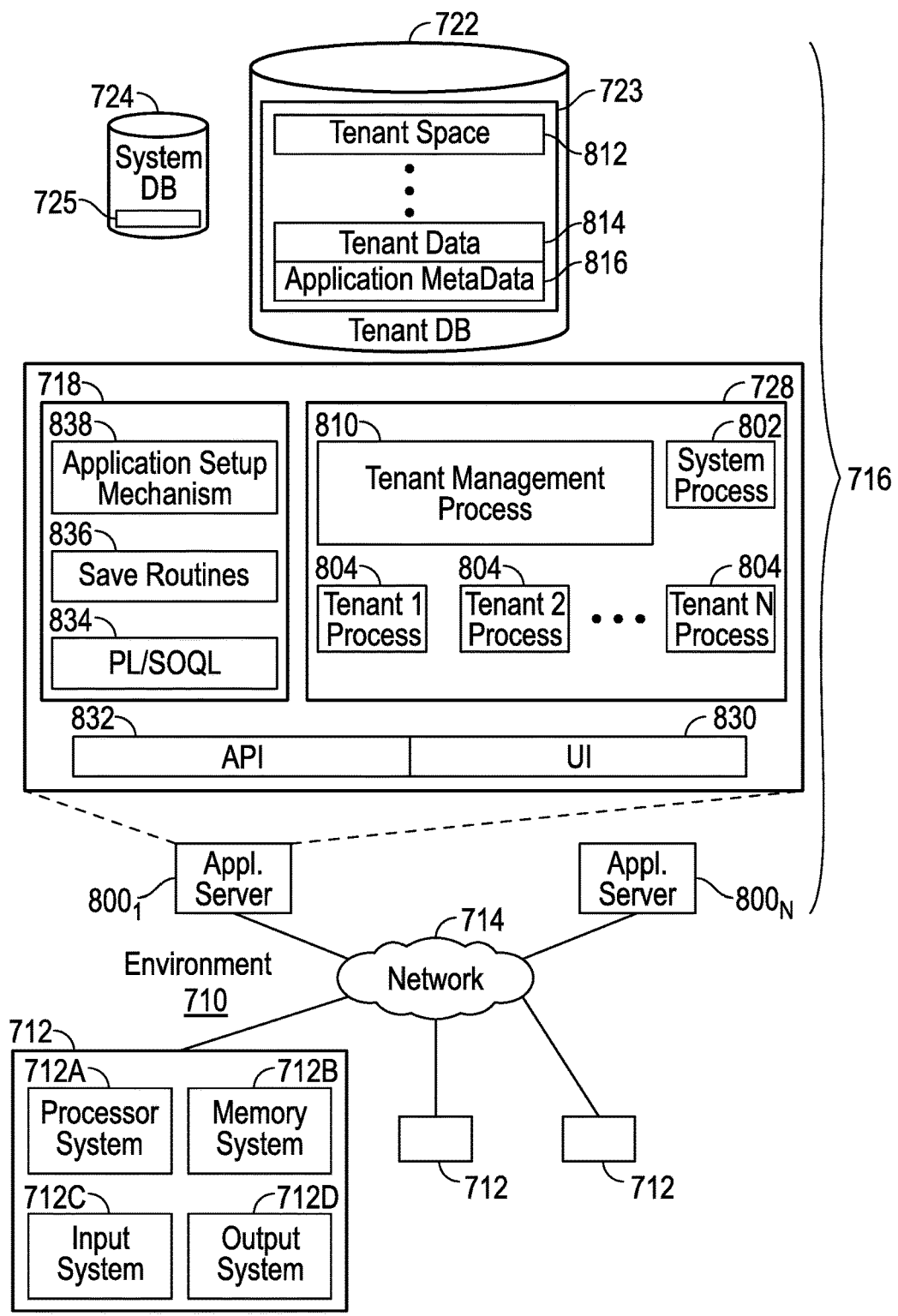
FIG. 8 illustrates a block diagram of another example environment in which the embodiments described herein may be implemented.

FIG. 8 illustrates a block diagram of another example environment 710, which may be used to implement the embodiments described herein. Some of the elements in FIG. 8 overlap with those in FIG. 7, and therefore FIG. 8 will be described with reference to FIG. 7, and common numbering will be used for elements in FIG. 8 that are shown in FIG. 7. FIG. 8 also illustrates elements of system 716 and various interconnections, according to one embodiment. FIG. 8 shows that user system 712 may include processor system 712A (analogous to processing system(s) 702 in FIG. 7), memory system 712B (analogous to main memory 704 in FIG. 7), input system 712C (analogous to input system(s) 716 in FIG. 7), and output system 712D (analogous to output system(s) 718 in FIG. 7). FIG. 8 shows network 714 and system 716. FIG. 8 also shows that system 716 may include tenant data storage 722, tenant data 723, system data storage 724, system data 725, user interface (UI) 830, application program interface (API) 832, PL/Salesforce.com object query language (PL/SOQL) 834, save routines 836, application setup mechanism 838, applications servers $800_1$-$900_N$, system process space 802, tenant process spaces 804, tenant management process space 810, tenant storage area 812, user storage for tenant data 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown in FIG. 7, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to access tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes and to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810, for example. Invocations to such applications may be coded using PL/SOQL 834 that provides a programming language style interface extension to API 832. Invocations to applications may be detected by one or more system processes, which manage retrieving application metadata 816 for the subscriber, making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer control protocol and Internet protocol (TCP/IP) are typical protocols for communicating between application servers 800 and the database system. However, it will be apparent to one skilled in the art that other transport protocols may be used to optimize the system depending on the network connection used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles the storage of, and access to, different objects, data and applications across disparate users and organizations.

As an example of storage, one tenant might be a company that employs a sales force where each salesperson uses system 716 to manage his or her sales process. Thus, a user might maintain contact data, leads data, customer follow-up data, performance data, goals and progress data, etc., all applicable to that user's personal sales process (e.g., in tenant data storage 722). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more structured query language (SQL) statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method for providing customized web pages to users of a website that are customized for the users based on details about the users, wherein each web page is customized for a given user, the method comprising:

at a logic layer of a server system comprising at least one hardware-based processor:

retrieving, from a user information store stored at a database of the server system in response to a login request from a particular user, user information associated with the particular user, wherein the user information store comprises: a plurality of first entries each being configured to store user information for each user;

retrieving, based on the user information, a particular identifier stored by a particular node in a tree-like data structure that is stored in a cache that resides in memory at the server system, wherein the particular identifier has a particular value, wherein the tree-like data structure comprises: a plurality of branches comprising a plurality of nodes each being configured to store a name that matches a detail specified by the user information and a value that serves as an identifier that refers to a second entry in a content store maintained at the database of the server system separate from the user information store, and wherein the content store comprises a plurality of second entries each being configured to store an identifier and either: customized content for a user that is used to render a customized web page customized for that user, an attached file that comprises the customized content, or a link to access the customized content, wherein the particular node is a lowest-level node in the tree-like data structure that is determined to have a name that matches one of the details specified by the user information associated with the particular user, and wherein the particular identifier serves as a primary key that the logic layer can use to access a corresponding one of the second entries in the content store that also includes the particular identifier having the particular value; and retrieving particular customized content for the particular user from the corresponding one of the second entries in the content store that includes the particular identifier having the particular value that was retrieved from the particular node in the tree-like data structure based on the user information; and communicating the particular customized content for the particular user from the server system to a particular user system associated with the particular user.

2. A method according to claim 1, wherein the server system comprises a user interface layer, and further comprising:

at the user interface layer of the server system:

receiving the login request from the particular user system for a web page of the website, wherein the login request comprises credentials for the particular user; and establishing, upon accepting the login request, a connection to the logic layer; and further comprising:

processing, at the logic layer, the login request from the user interface layer to generate the query to retrieve the user information.

3. A method according to claim 1, further comprising:

displaying, at the particular user system, a particular customized web page of the website that includes the particular customized content for that particular user.

4. A method according to claim 1, wherein the user information for the particular user comprises: one or more details that are associated with that particular user, wherein each of the details have a name, and wherein the nodes of the tree-like data structure are arranged into a plurality of n different levels, wherein each node has a name and a corresponding identifier associated with that node, and wherein each detail of the user information corresponds to one of the nodes of the tree-like data structure.

5. A method according to claim 4, wherein the step of retrieving, based on the user information, the particular identifier, comprises:

at the logic layer:

issuing a call to the cache for each detail of the user information to determine whether there is a corresponding node in the tree-like data structure that has a name that matches that detail of the user information, wherein the logic layer issues the one or more calls starting with a first call for a first detail specified in the user information that is associated with a first level and ending with a last call for a last detail specified in the user information; and retrieving, based on the user information, the particular identifier from the lowest-level node in the tree-like data structure that is determined to have the name that matches the one of the details specified by the user information.

6. A method according to claim 1, wherein the plurality of nodes comprise:

a root level node configured to store a default identifier; and a plurality of first level nodes each being configured to store a first level name and a first level identifier that corresponds to an identifier in the content store that is associated with customized content in the content store.

7. A method according to claim 6, wherein the plurality of nodes further comprise:

one or more nth level nodes, where each nth level node is configured to store an nth level name and an nth level identifier that corresponds to an identifier in the content store that is associated with customized content in the content store, wherein n is an integer greater than or equal to two.

8. A method according to claim 1, wherein the user information store is a user table, and wherein each first entry in the user table comprises:
   a row that stores user information for a user, wherein each row comprises properties fields that each store a detail about that user, and
   wherein the content store is content table, and wherein each second entry in the content table comprises:
   a row that stores an identifier and a binary large object (BLOB) that comprises customized content that is used to generate a customized web page.

9. A method according to claim 1, wherein the database is a tenant database that stores data for multiple tenants, and wherein the logic layer is a tenant management process layer, wherein the user information store is a user object, and wherein each first entry of the user object comprises:
   a record that stores user information for a user, wherein each record comprises properties fields that each store a detail about that user, and
   wherein the content store is a content custom object, and wherein each second entry of the content custom object comprises:
   a record that stores an identifier and an attached file that comprises customized content that is used to generate a customized web page.

10. A server system configured to provide web pages to users of a web site that are customized for the users based on details about the users, wherein each web page is customized for a given user, the server system comprising:
    a database comprising:
      a user information store comprising a plurality of first entries each being configured to store user information for a user; and
      a content store separate from the user information store, and comprising a plurality of second entries each being configured to store an identifier and either: customized content for a user that is used to render a customized web page customized for that user, an attached file that comprises the customized content, or a link to access the customized content;
    a cache that resides in memory and that is configured to store a tree-like data structure comprising: a plurality of branches comprising a plurality of nodes, wherein each node is configured to store a name that matches a detail specified by the user information, and an identifier that refers to one of the second entries in the content store;
    a processing system comprising one or more hardware-based processors being configured to control execution of a logic layer and a user interface layer, wherein, upon execution by the one or more hardware-based processors, the logic layer is configured to:
      retrieve, in response to a login request from a particular user, user information associated with the particular user from the user information store;
      retrieve, based on the user information, a particular identifier stored by a particular node in the tree-like data structure, wherein the particular identifier has a particular value, wherein the particular node is a lowest-level node in the tree-like data structure that is determined to have a name that matches one of the details specified by the user information associated with the particular user, and wherein the particular identifier serves as a primary key that the logic layer can use to access a corresponding one of the second entries in the content store that also includes the particular identifier having the particular value;
      access a corresponding one of the second entries in the content store that includes the particular identifier having the particular value;
      retrieve, from the content store, particular customized content for the particular user using the corresponding one of the second entries in the content store that includes the particular identifier having the particular value that was retrieved from the particular node in the tree-like data structure based on the user information; and
    wherein the user interface layer is configured to: communicate the particular customized content for the particular user to a particular user system associated with the particular user.

11. A server system according to claim 10, wherein the user interface layer is further configured to:
    receive the login request from the particular user system for a web page of the website, wherein the login request comprises credentials for the particular user; and
    upon accepting the login request, establish a connection to the logic layer, and
    wherein the logic layer is further configured to: process the login request from the user interface layer to generate the query to retrieve the user information.

12. A server system according to claim 10, wherein the particular user system is configured to:
    display a particular customized web page of the website that includes the particular customized content for that particular user.

13. A server system according to claim 10, wherein the user information for the particular user comprises: one or more details that are associated with that particular user, wherein each of the details have a name, and
    wherein the nodes of the tree-like data structure are arranged into a plurality of n different levels, wherein each node has a name and a corresponding identifier associated with that node, and wherein each detail of the user information corresponds to one of the nodes of the tree-like data structure, and
    wherein the logic layer is further configured to:
      for each detail of the user information that is associated with the particular user: issue a call to the cache to determine whether there is a corresponding node in the tree-like data structure that has a name that matches that detail of the user information, wherein the logic layer issues the one or more calls to the cache starting with a first call for a first detail specified in the user information that is associated with a first level, and ending with a last call for a last detail specified in the user information;
      retrieve the particular identifier from the lowest-level node in the tree-like data structure that is determined to have the name that matches the one of the details specified by the user information.

14. A server system according to claim 10, wherein the plurality of nodes comprise:
    a root level node configured to store a default identifier;
    a plurality of first level nodes each being configured to store a first level name and a first level identifier that corresponds to an identifier in the content store that is associated with customized content in the content store; and one or more nth level nodes, where each nth level node is configured to store an nth level name and an nth level identifier that corresponds to an identifier in the content store that is associated with customized content in the content store.

15. A server system according to claim 10, wherein the plurality of nodes comprise:
   a root level node configured to store a default identifier;
   a plurality of first level nodes each being configured to store a first level name that corresponds to a particular country and a first level identifier that corresponds to an identifier in the content store that is associated with customized content in the content store;
   a plurality of second level nodes each being configured to store a second level name that corresponds to a particular state or region and a second level identifier that corresponds to an identifier in the content store that is associated with customized content in the content store; and
   a plurality of third level nodes each being configured to store a third level name that corresponds to a particular business type and a third level identifier that corresponds to an identifier in the content store that is associated with customized content in the content store; and
   one or more fourth level nodes, where each fourth level node is configured to store a fourth level name that corresponds to a particular channel of the particular business type and a fourth level identifier that corresponds to an identifier in the content store that is associated with customized content in the content store.

16. A server system according to claim 10, wherein the plurality of nodes comprise:
   a root level node that corresponds to a particular state and that is configured to store a default identifier;
   a plurality of first level nodes each being configured to store a first level name that corresponds to a particular school district within the particular state and a first level identifier that corresponds to an identifier in the content store that is associated with customized content in the content store;
   a plurality of second level nodes each being configured to store a second level name that corresponds to a particular school within the particular school district and a second level identifier that corresponds to an identifier in the content store that is associated with customized content in the content store; and
   a plurality of third level nodes each being configured to store a third level name that corresponds to a particular grade within a particular school and a third level identifier that corresponds to an identifier in the content store that is associated with customized content in the content store.

17. A server system according to claim 10, wherein the user information store is a user table, and wherein each first entry in the user table comprises:
   a row that stores user information for a user, wherein each row comprises properties fields that each store a detail about that user, and
   wherein the content store is content table, and wherein each second entry in the content table comprises:
   a row that stores an identifier and a binary large object (BLOB) that comprises customized content that is used to generate a customized web page.

18. A server system according to claim 10, wherein the database is a tenant database that stores data for multiple tenants, and wherein the logic layer is a tenant management process layer, wherein the user information store is a user object, and wherein each first entry of the user object comprises:
   a record that stores user information for a user, wherein each record comprises properties fields that each store a detail about that user, and
   wherein the content store is a content custom object, and wherein each second entry of the content custom object comprises:
   a record that stores an identifier and an attached file that comprises customized content that is used to generate a customized web page.

19. A computer program product, comprising:
   a non-transitory computer readable medium having a computer readable program code embodied therein that is readable by a processing circuit and storing instructions capable of execution by the processing circuit to perform a method, the method comprising:
   retrieving from a user information store stored at a database of the server system, in response to a login request from a particular user, user information associated with the particular user, wherein the user information store comprises: a plurality of first entries each being configured to store user information for each user;
   retrieving, based on the user information, a particular identifier stored by a particular node in a tree-like data structure that is stored in a cache that resides in memory at the server system, wherein the particular identifier has a particular value, and wherein the tree-like data structure comprises: a plurality of branches comprising a plurality of nodes each being configured to store a name that matches a detail specified by the user information and a value that serves as an identifier that refers to a second entry in a content store maintained at the database of the server system separate from the user information store, and wherein the content store comprises a plurality of second entries each being configured to store an identifier and either: customized content for a user that is used to render a customized web page customized for that user, an attached file that comprises the customized content, or a link to access the customized content, wherein the particular node is a lowest-level node in the tree-like data structure that is determined to have a name that matches one of the details specified by the user information associated with the particular user, and wherein the particular identifier serves as a primary key that the logic layer can use to access a corresponding one of the second entries in the content store that also includes the particular identifier having the particular value; and
   retrieving particular customized content for the particular user from the corresponding one of the second entries in the content store that includes the particular identifier having the particular value that was retrieved from the particular node in the tree-like data structure based on the user information, wherein the particular customized content is to be displayed as part of a particular customized web page of a web site that is customized for that particular user.

20. A computer program product according to claim 19, wherein the user information for the particular user comprises: one or more details that are associated with that particular user, wherein each of the details have a name, and
   wherein the nodes of the tree-like data structure are arranged into a plurality of n different levels, wherein each node has a name and a corresponding identifier associated with that node, and wherein each detail of the user information corresponds to one of the nodes of the tree-like data structure.

* * * * *